US007613658B2

(12) United States Patent
Coyle

(10) Patent No.: US 7,613,658 B2
(45) Date of Patent: Nov. 3, 2009

(54) METHODS AND SYSTEMS FOR REDEEMING A STORED-VALUE CARD

(75) Inventor: Adam Coyle, Parker, CO (US)

(73) Assignees: First Data Corporation, Greenwood Village, CO (US); The Western Union Company, Englewood, CO (US)

(*) Notice: Subject to any disclaimer, the term of this patent is extended or adjusted under 35 U.S.C. 154(b) by 253 days.

(21) Appl. No.: 11/534,962

(22) Filed: Sep. 25, 2006

(65) Prior Publication Data

US 2007/0045409 A1    Mar. 1, 2007

Related U.S. Application Data

(63) Continuation of application No. 09/713,603, filed on Nov. 15, 2000, now Pat. No. 7,127,426.

(51) Int. Cl.
*G06Q 40/00* (2006.01)

(52) U.S. Cl. ............... 705/41; 705/37; 705/44; 705/45

(58) Field of Classification Search ............ 705/41, 705/37, 44, 45
See application file for complete search history.

(56) References Cited

U.S. PATENT DOCUMENTS

| | | | | |
|---|---|---|---|---|
| 4,083,635 A * | 4/1978 | Reed, Jr. | ............ | 355/77 |
| 4,833,312 A * | 5/1989 | Minematsu et al. | ......... | 235/379 |
| 5,021,967 A * | 6/1991 | Smith | ............ | 705/18 |
| 5,377,271 A * | 12/1994 | Foreman et al. | ............ | 380/51 |
| 5,500,514 A * | 3/1996 | Veeneman et al. | ......... | 235/381 |
| 6,000,608 A * | 12/1999 | Dorf | ............ | 235/380 |
| 6,108,641 A * | 8/2000 | Kenna et al. | ............ | 705/35 |
| 6,338,049 B1 * | 1/2002 | Walker et al. | ............ | 705/44 |
| 6,367,693 B1 * | 4/2002 | Novogrod | ............ | 235/379 |
| 6,434,238 B1 * | 8/2002 | Chaum et al. | ............ | 380/45 |
| 6,467,684 B2 * | 10/2002 | Fite et al. | ............ | 235/379 |
| 6,478,220 B2 * | 11/2002 | Seifert et al. | ............ | 235/379 |
| 6,511,377 B1 * | 1/2003 | Weiss | ............ | 463/25 |
| 6,575,362 B1 * | 6/2003 | Bator et al. | ............ | 235/381 |
| 6,611,819 B1 * | 8/2003 | Oneda | ............ | 705/41 |
| 6,902,518 B2 * | 6/2005 | Bretl | ............ | 493/375 |

FOREIGN PATENT DOCUMENTS

| | | | |
|---|---|---|---|
| GB | 2224874 | * | 5/1990 |
| JP | 403001290 | * | 7/1991 |

* cited by examiner

*Primary Examiner*—Jagdish N Patel
(74) *Attorney, Agent, or Firm*—Townsend and Townsend and Crew LLP

(57) ABSTRACT

A reloadable debit card system includes an issuing institution whereat a main account is set up and multiple sub-accounts are established thereunder. Each sub-account corresponds to a respective cardholder. The sub-accounts are established and debit cards are printed with respective sub-account numbers prior to distributing the cards to an 80 POS distribution network. The cards are purchased from the POS member establishments for predetermined incremental values. Value can be added to such cards in such increments. A reloadable debit card method includes the steps of establishing a main account at an issuing institution and establishing sub-accounts thereunder. Multiple debit cards are printed with the respective sub-account numbers. The cards are then distributed to POS establishments for sale to cardholders, resulting in credits to the sub-accounts. Goods and services can be purchased with the cards whereupon the sub-accounts are debited. Negotiable instruments, such as money orders and the like, can optionally be purchased with the cards.

12 Claims, 2 Drawing Sheets

METHODS AND SYSTEMS FOR REDEEMING A STORED-VALUE CARD

CROSS REFERENCE TO RELATED APPLICATION

This application is a continuation of U.S. patent application Ser. No. 09/713,603, entitled "RELOADABLE DEBIT CARD SYSTEM AND METHOD," filed Nov. 15, 2000 by Adam Coyle, the entire disclosure of which is incorporated herein by reference for all purposes.

BACKGROUND OF THE INVENTION

1. Field of the Invention

The present invention relates generally to debit cards, and in particular to a non-cash, value-added, reloadable card which can be issued anonymously.

2. Description of the Prior Art

Commercial transactions typically involve transferring funds. Payments for goods and services involve transferring funds from buyers to sellers. Payments are also made on accounts. Payments can be made with cash, checks, drafts and various other negotiable instruments. Such methods all have their advantages. However, credit and debit cards enjoy ever-increasing popularity for paying on accounts and for purchasing goods and services.

An important advantage of credit/debit cards relates to their security. For example, even if a card is lost or stolen, its owner is normally exposed to only limited liability, if any, for its misuse. Moreover, various security measures tend to minimize unauthorized credit/debit card usage. By verifying cardholder identities and by invoking other security measures, commercial institutions have achieved some measure of success in curbing credit/debit card fraud. Such measures notwithstanding, credit/debit card fraud and the related problem of identity theft continue to cause huge losses.

Credit cards essentially provide their holders with lines of credit from issuing institutions. Thus, purchases and account payments result in credit card account balances. The cardholders are responsible for paying these balances pursuant to the terms and conditions of the credit card agreements.

Debit cards, on the other hand, are used for spending funds which have been pre-deposited in cardholders' accounts. They tend to operate much like checking accounts because consumers generally cannot exceed predetermined limits based on their previous deposits with the issuing institutions.

Various systems and methods have previously been proposed for providing consumers with the convenience of credit/debit cards with certain use restrictions. For example, the Levine et al. U.S. Pat. No. 5,477,038 discloses a method and apparatus for distributing currency using debit cards. Special-purpose cards have also been proposed and include pre-paid telephone calling cards. An example is shown in the Stimson et al. U.S. Pat. No. 5,511,114. The Stimson et al. U.S. Pat. Nos. 5,577,109 and No. 5,721,768 also show pre-paid (i.e., debit) cards, which are designed for general purchases.

Debit cards are also used for obtaining cash from pre-funded accounts. The Cucinotta et al. U.S. Pat. No. 5,663,546 discloses an example of such a card. The cardholder can remain anonymous whereby cash transfers can be made confidentially. The global computer network ("Internet") has been utilized for loading debit cards, which can then be used for making purchases over the global computer network. An example of such a system and architecture is shown in the Davis et al. U.S. Pat. No. 6,105,008.

Other types of debit cards include "gift" cards, which are typically not reloadable. Gift cards are available in variations which permit cash to be dispensed and in other variations which are restricted to purchases of goods and services. For example, Western Union offers gift cards for dispensing cash to card holders, who can remain anonymous.

Heretofore there has not been available a reloadable debit card system and method for purchasing goods and services with the advantages and features of the present invention.

SUMMARY OF THE INVENTION

In the practice of the present invention, a reloadable, non-cash dispensing debit card system is provided. The system includes an issuing institution with a main account. Multiple sub-accounts are established under the main account and are associated with respective debit cards issued by the issuing institution. The debit cards are pre-assigned sub-account numbers and incremental face values. The face values can be determined by a cardholder/purchaser within a predetermined incremental value structure allowing the face value of the card to be adjusted in predetermined increments. The cards are distributed to retail (POS) establishments for sale to cardholders/purchasers who can use them for purchasing goods and services, but not for cash redemption. Optionally, the cards can be used to purchase negotiable instruments, such as money orders.

In the practice of the method of the present invention, an issuing institution establishes a main account with sub-accounts which are assigned identifying numbers associated with individual debit cards. The cards are distributed to retail (POS) merchants and sold to customers/cardholders. Goods and services are purchased with the cards, which can be reloaded with additional value in predetermined increments.

OBJECTS AND ADVANTAGES OF THE INVENTION

The principal objects and advantages of the present invention include: providing a reloadable debit card system and method; providing a debit card for such a system; providing such a card which can be used anonymously; providing such a card which can be reloaded in predetermined increments; providing such a card which can be restricted to goods and services purchases; providing such a card which can be pre-printed for distribution to retail (POS) establishments for resale; providing such a card which can be used for the purchase of goods and services throughout a network of subscribing merchants; providing a method of purchasing goods and services with reloadable debit cards; providing such a method wherein the cards are preprinted; providing such a method wherein the cards are reloadable in incremental value amounts; and providing a card-based purchasing system and method which are efficient in operation, secure and particularly well adapted for the proposed uses thereof.

Other objects and advantages of the present invention will become apparent from the following description, wherein are set forth exemplary embodiments thereof.

DETAILED DESCRIPTION OF THE PREFERRED EMBODIMENTS

I. Introduction and Environment

Figure 1:
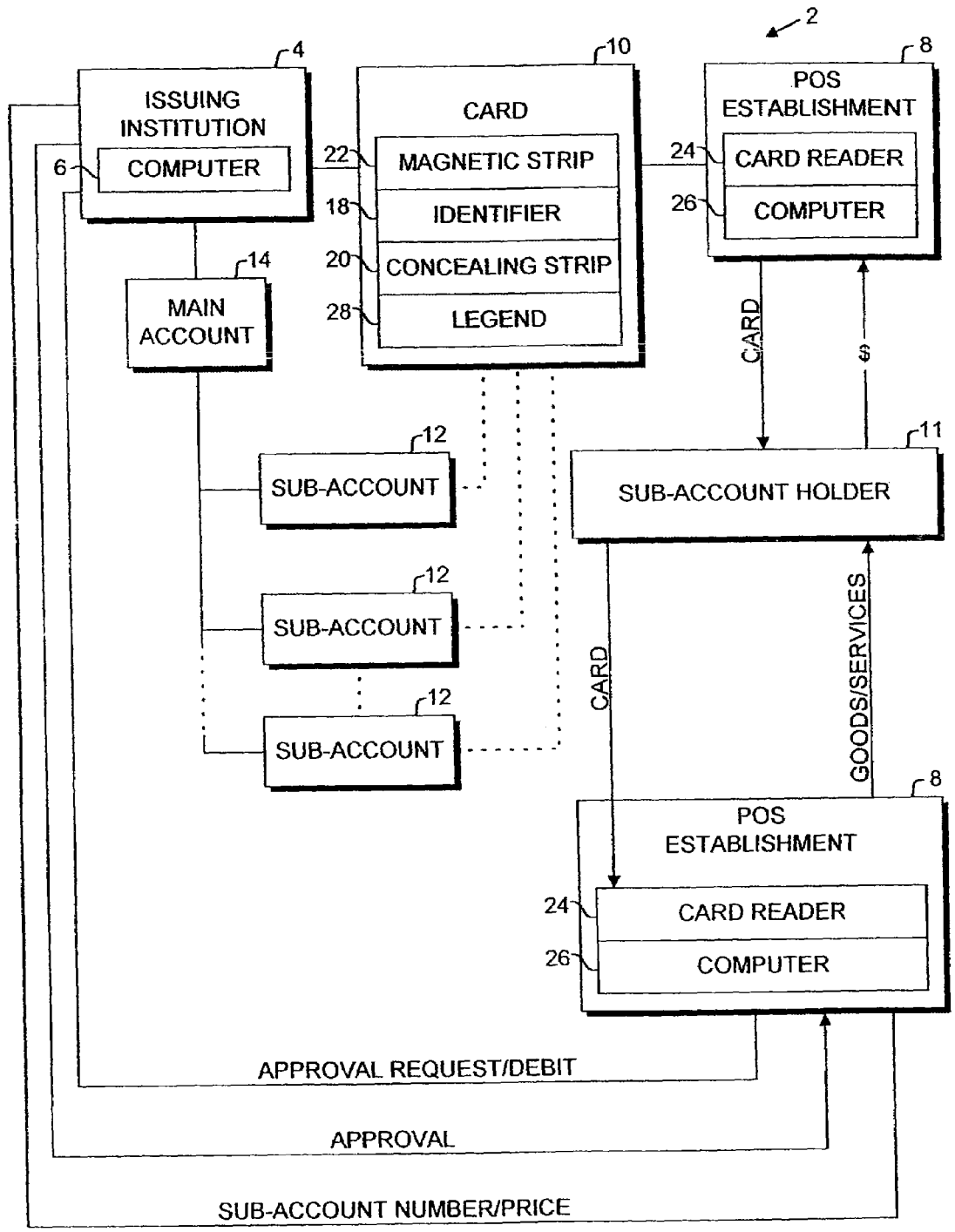
FIG. 1 is a schematic block diagram of a reloadable debit card system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a system for purchasing goods and services with a reloadable (value-added) debit card 10. The system 2 includes a card-issuing institution 4. The institution 4 can comprise any suitable financial institution, such as a bank, a credit/debit card company, a credit union, etc. A host computer 6 is associated with the issuing institution 4 for supporting the system 2. A point-of-sale (POS) retail establishment network 8 comprises merchants and other entities providing goods and services which preferably subscribe to the card-acceptance program of the institution 4. By way of example, and without limitation on the generality of useful applications of the system 2, the institution 4 can comprise a major credit card company and the POS network 8 can accept the credit card as a form of payment for their respective goods and services. It will be appreciated that by aligning the system 2 with such an institution, a very large and widespread market can potentially be reached due to the widespread acceptance and usability of value-added cards 10 issued by the institution 2.

FIG. 1 shows two POS retail establishment networks 8, which can comprise retail merchants respectively issuing the card 10 and conducting a sales transaction with the card holder 11. However, the same POS retail establishments 8 can conduct both activities, i.e., card 10 sales and merchandise sales. Moreover, as noted above, the number of retail establishments in the network 8 is virtually unlimited and all of them can conduct transactions in both cards 10 and merchandise.

The cards 10 can be preprinted by the institution 4 for distribution to the POS network 8 for sales to individual consumers 12 who thereby become holders of sub-accounts 12. The sub-accounts 12 are established under a main account 14 maintained by the institution 4 and represent an aggregate of the sub-accounts 12 in a particular system 2. Each card 10 is imprinted with a sub-account identifier 18, such as a number or combination of alpha and/or numeric characters or digits, which are associated with a respective sub-account 12. The printed identifier 18 can be selectively covered by a concealing strip 20, which can be in place, for example, prior to purchase and removed by the sub-account holder 11 prior to use. In this manner security can be provided whereby the identifier 18 is kept confidential.

Each card 10 is also equipped with a magnetic strip 22 for recording the identifier 18 which can be detected by a magnetic card reader 24 associated with a POS establishment 8. The card reader 24 is connected to a POS computer terminal 26, which is linked (e.g. hardwired, via internet, wirelessly, etc.) to the institution host computer 6. Transactions can thus be submitted essentially instantaneously to the institution 4 for approval or rejection, depending upon the account balance in the sub-account 12.

Security is provided for the system 2 by employing several procedures. Firstly, the use of the card 10 can be limited to payment for goods and/or services, which can broadly include negotiable instruments such as money orders, cashiers checks, travelers checks, etc., made payable to the sub-account holder. By preventing the use of the card 10 to directly acquire cash, the cards 10 are less inviting for theft, misuse, etc. The concealed identifier 18 also provides security, and the card 10 can be imprinted with a suitable legend 28 suggesting that the identifier 18 be kept confidential and that the card not be accepted with a pre-exposed identifier 18, which might indicate that security for the card 10 had been compromised. Still further, the POS establishment 8 can require the use of a magnetic card reader 24 for insuring that the card 10 must physically be present for a transaction to be conducted. Still further, a PIN could be assigned to each sub-account 12, which PIN would not appear on the card 10 but would be known to the sub-account holder 11 for verification of his or her card ownership and hence authorization to conclude the transaction.

II. Value-Added Card Transaction Method

Figure 2:
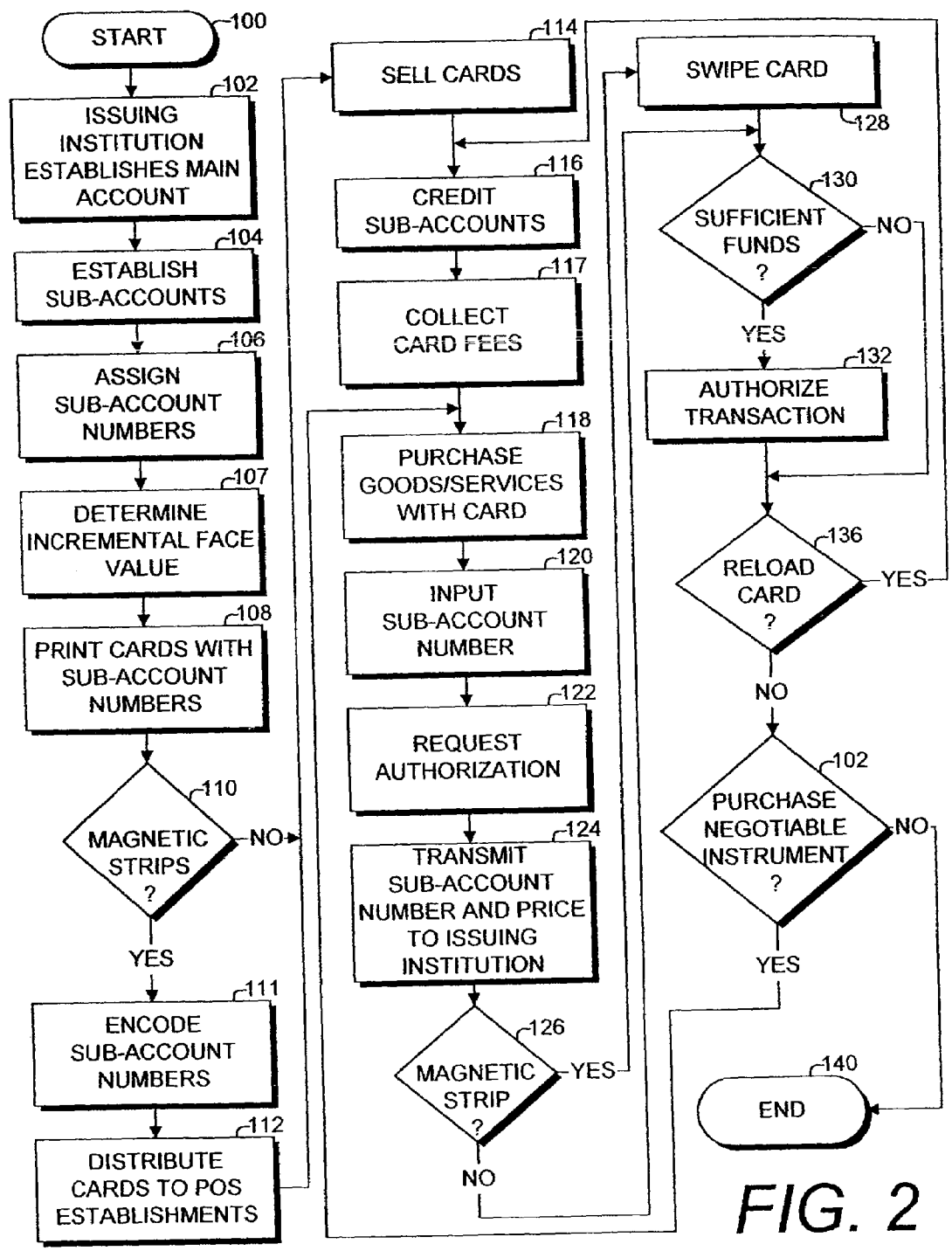
FIG. 2 is a flow diagram of a reloadable debit card method embodying the present invention.

FIG. 2 is a flow chart depicting an exemplary debit or value-added card transaction method embodying the present invention. The method commences at start 100 and proceeds to an establish main account by card-issuing institution step 102. The main account is configured with multiple sub-accounts established at 104 and each sub-account 12 is assigned an account number at 106. Incremental face values for the cards 10 are determined at 107. For example, the cards 10 can have predetermined incremental face values of $5, $10, etc. Cards 10 are printed with their sub-account numbers at 108.

The cards 10 can optionally be provided with magnetic strips 22 at decision block 110 which, if answered affirmatively, results in the cards 10 being encoded with their sub-account numbers at 111. If the cards do not have magnetic strips 22 (negative branch from decision block 110), or after the sub-account numbers are encoded at 111, the method proceeds to distributing the cards 10 to merchant (POS) establishments 8 at 112.

The cards 10 can be pre-distributed to the POS network at 112 for inventorying same. The card sales occur at 114 whereupon the sub-accounts 12 are credited at 116 and the POS establishment collects the card fees representing the card values plus the transaction fees at 117. Procedures for implementing the method can be simplified by providing the added value in predetermined increments, such as $5, $10, $20, etc., as indicated by the determine incremental face value step 107.

The sub-account holder purchases goods and/or services (i.e., at any POS establishment subscribing to the POS network 8) with the card 10 at 118 whereupon the sub-account number is input at 120. It will be appreciated that the account number input step 130 can be accomplished in various ways. For example, the account number could be read by a magnetic card reader from the magnetic strip. Alternatively, the account number could be input with a keypad or numeric keyboard. Still further, the account number could be input remotely, e.g., by telephone or by global computer network (Internet).

Purchase authorization is requested by the POS member establishment 8 at 122 by transmitting the sub-account number and the requested amount (i.e., price) to the issuing institution 4 at 124. If a magnetic strip 22 is present on the card 10, as determined at decision block 126, the card 10 is swiped by a magnetic card reader 22 at 128. If the decision at 126 is negative, or after swiping the card at 128, a "Sufficient Funds?" decision box 130 is reached. If affirmative, the transaction is authorized at 132 and the method proceeds to an end block 134. If the sub-account balance is insufficient to cover the transaction and any fees associated therewith (negative branch from "Sufficient Funds?" decision block 130), the method proceeds to a "Reload Card?" decision block at 136. The affirmative branch from the decision block 136 leads to the credit sub-account step at 114. Otherwise (negative branch from "Reload Card?" decision block 136) the method proceeds to the end block 134.

It will be appreciated that the card 10 can be utilized indefinitely by simply adding to its incremental value as needed at 116. Optionally, the affirmative branch from a "Purchase Negotiable Instrument?" decision block 138 provides for payment of all or part of the entire value of the card (after deducting transaction fees). Payment can be made in the form of a negotiable instrument, such as a money order, cashiers check, etc. made payable to the sub-account holder 11. The sub-account holder 11 can present the negotiable instrument for cashing same. Such a negotiable instrument purchase can be handled like any other goods or services purchase with the card 10. The negative branch from the "Purchase Negotiable Instrument?" decision block 138 leads to the end block 140.

From a reading of the description above pertaining to the disclosed embodiments of the present invention, modifications and variations thereto may become apparent to those skilled in the art. Other alternatives and variations may also become apparent to those of ordinary skill in the art upon a close examination of this specification in view of the drawings. It should be appreciated that many features and aspects of the present invention were described above by way of example only and are therefore not intended to be interpreted as required or essential elements of the invention. Any elements of the invention that are required or essential would have been explicitly indicated to be so, for example by describing that the element "must" be included. Therefore, the scope of the present invention is to be limited only by the following appended claims.

What is claimed and desired to be secured by Letters Patent is as follows:

1. A method of redeeming a stored-value card, the method comprising:
    a host computer receiving information of a sale of the stored value card to a consumer, the received information comprising a card identifier stored in the stored value card, and initial value of funds stored in the stored value card;
    the host computer establishing under a main account, a sub-account, wherein an individual consumer is identified as a holder of the sub-account, and wherein the sub-account is associated with the card identifier stored in the store value card and the host computer credits the sub-account with the initial stored value of funds as an account balance;
    receiving a redemption request at the host computer via one or more computational devices at a point-of-sale establishment communicably coupled with the host computer, the redemption request comprising a card identifier extracted from the stored-value card and a payment amount to be redeemed;
    the host computer identifying the sub-account associated with the stored-value card from the card identifier associated with the redemption request;
    the host computer generating a negotiable instrument in an amount of the payment or less than the payment based on the account balance of the identified sub-account, the negotiable instrument payable to the identified holder of the sub-account; and
    the host computer transmitting the generated negotiable instrument to the point-of-sale via the one or more computational devices at the point-of-sale establishment.

2. The method recited in claim 1 wherein the negotiable instrument comprises a money order.

3. The method recited in claim 1 wherein:
    the stored-value card comprises a magnetic stripe; and
    the card identifier was extracted from the magnetic stripe.

4. The method recited in claim 1 wherein the redemption request further comprises a purported PIN, the method further comprising confirming that the purported PIN is the same as a PIN associated with the identified sub-account.

5. The method recited in claim 1 wherein the amount is equal to the balance of the identified sub-account.

6. The method recited in claim 1 further comprising:
    receiving a reload request at the host computer, the reload request comprising the card identifier and a reload amount;
    identifying the sub-account associated with the stored-value card from the card identifier; and
    issuing an instruction to increase the amount of the identified sub-account by the reload amount.

7. A host computer communicatively connected with computational devices at point-of-sale establishments, the host computer comprising:
    a processor;
    and a memory unit communicably linked to the processor;
    the memory unit having stored instructions executable by the processor comprising;
        instructions to receive information of a sale of a stored-value card from at least one of the computational devices at a point-of-sale establishment to a consumer, the received information comprising a card identifier stored in the stored value card, and initial value of funds stored in the stored value card;
        instructions to establish, under a main account, a sub-account, wherein the individual consumer is identified as a holder of the sub-account, and wherein the sub-account is associated with the card identifier stored in the store value card;
        instructions to credit the sub-account with the initial stored value of funds as an account balance;
        instructions to receive a redemption request via one or more computational devices at a point-of-sale establishment, the redemption request comprising a card identifier extracted from a stored-value card and a payment amount to be redeemed;
        instructions to identify the sub-account associated with the stored-value card from the card identifier associated with the redemption request;
        instructions to generate a negotiable instrument in an amount of the payment or less than the payment amount based on the account balance of the identified sub-account, the negotiable instrument payable to the identified holder of the sub-account; and
        instructions to transmit the generated negotiable instrument to the point-of-sale via the one or more computational devices at the point-of-sale establishment.

8. The host computer recited in claim 7 wherein the negotiable instrument comprises a money order.

9. The host computer recited in claim 7 wherein:
the stored-value card comprises a magnetic stripe; and
the card identifier was extracted from the magnetic stripe.

10. The host computer recited in claim 7 wherein the redemption request further comprises a purported PIN, the host computer further comprising programming instructions to confirm that the purported PIN is the same as a PIN associated with the identified sub-account.

11. The host computer recited in claim 7 wherein the amount is equal to the balance of the identified sub-account.

12. The host computer recited in claim 7 further comprising:

programming instructions to receive a reload request, the reload request comprising the card identifier and a reload amount;

programming instructions to identify the sub-account associated with the stored-value card from the card identifier; and programming instructions to issue an instruction to increase the amount of the identified sub-account by the reload amount.

* * * * *